(12) United States Patent
Forrer

(10) Patent No.: US 10,809,238 B2
(45) Date of Patent: Oct. 20, 2020

(54) OVEN INSULATION ARRANGEMENT

(71) Applicant: Mettler-Toledo GmbH, Greifensee (CH)

(72) Inventor: Christian Forrer, Elsau (CH)

(73) Assignee: Mettler-Toledo GmbH, Greifensee (CH)

(*) Notice: Subject to any disclaimer, the term of this patent is extended or adjusted under 35 U.S.C. 154(b) by 190 days.

(21) Appl. No.: 16/059,520

(22) Filed: Aug. 9, 2018

(65) Prior Publication Data
US 2019/0049417 A1 Feb. 14, 2019

(30) Foreign Application Priority Data

Aug. 10, 2017 (EP) ..................... 17185696

(51) Int. Cl.
| G01N 31/16 | (2006.01) |
| F27B 17/02 | (2006.01) |
| F27D 1/00 | (2006.01) |
| F27D 7/04 | (2006.01) |
| G01N 31/12 | (2006.01) |
| F24C 15/00 | (2006.01) |
| G01N 1/40 | (2006.01) |

(52) U.S. Cl.
CPC .......... *G01N 31/168* (2013.01); *F27B 17/02* (2013.01); *F27D 1/0006* (2013.01); *F27D 1/0033* (2013.01); *F27D 7/04* (2013.01); *F24C 15/006* (2013.01); *G01N 1/4022* (2013.01); *G01N 31/12* (2013.01)

(58) Field of Classification Search
CPC .... G01N 31/168; G01N 1/4022; G01N 31/12; G01N 1/28; F27D 7/04; F27D 1/0033; F27D 1/0006; F27B 17/02; F24C 15/006; B01B 1/005

USPC .......................................... 73/75
See application file for complete search history.

(56) References Cited

U.S. PATENT DOCUMENTS

| 4,854,863 A * | 8/1989 | Hemsath ............... C21D 1/767 432/176 |
| 5,943,969 A | 8/1999 | Peake |
| 6,190,917 B1 | 2/2001 | Barclay et al. |
| 6,207,462 B1 | 3/2001 | Barclay et al. |
| 2001/0008773 A1 * | 7/2001 | Barclay ................... G01N 5/04 436/155 |
| 2006/0083495 A1 * | 4/2006 | Taiquing ............. F27B 17/0025 392/416 |
| 2013/0058372 A1 * | 3/2013 | Emami ............. H01L 21/67109 373/117 |
| 2013/0062333 A1 * | 3/2013 | Emami ..................... F27B 5/08 219/438 |
| 2017/0082296 A1 * | 3/2017 | Jeong ..................... F24C 15/28 |

FOREIGN PATENT DOCUMENTS

WO 2016/029955 A1 3/2016

* cited by examiner

Primary Examiner — Marrit Eyassu
(74) Attorney, Agent, or Firm — Standley Law Group LLP; Jeffrey S. Standley; Stephen L. Grant

(57) ABSTRACT

An analytical device has an oven arrangement (1) with an oven (2), an insulation system, a ventilation system and a housing. The ventilation system has a first convection system that uses natural convection, arranged to keep the housing cool, as well as a second convection system that uses forced convection, arranged to reduce the temperature in the oven (2). In particular, the analytical device is a component of a Karl Fischer titration instrument.

14 Claims, 5 Drawing Sheets

OVEN INSULATION ARRANGEMENT

CROSS-REFERENCE TO RELATED APPLICATIONS

This application claims priority to European Patent Application No. 17185696.6, filed on 10 Aug. 2017, which is incorporated by reference as if fully recited herein.

TECHNICAL FIELD

The invention relates to an oven arrangement with a thermal insulation system and a ventilation system and an oven. In particular, it relates to an oven arrangement used in the field of analytical chemistry and, most particularly, with a Karl Fischer titration.

BACKGROUND ART

Karl Fischer titration (KF titration) is a well-known process for an accurate and precise determination of the moisture or water content in a sample. The two methods for KF titration are mainly used are coulometric and volumetric titration. Both methods face the same issue that some substances release their moisture or water content only slowly or at elevated temperatures. Consequently, the KF titration process requires the evaporation of these samples through heating to determine their moisture or water content.

The sample is heated and thereby evaporated. The evaporated sample is transferred continuously to a titration cell by means of a dry carrier gas. In the titration cell, the evaporated sample is neutralised progressively and from the quantity of reagent necessary to neutralise the evaporated sample the moisture or water content of the sample can be determined. This procedure, in which the sample is heated and the evaporated water of the sample is transferred to a titration cell by means of a dry carrier gas, is referred to as the gas phase extraction method or oven method.

An automated Karl Fischer titration system can be provided to enable the processing of several samples consecutively. Said automated Karl Fischer titration system further comprises a sample changer, an oven and a transfer system to transfer each sample or a respective vial containing said sample from the sample changer to the oven for heating the sample. The temperature of the oven can be controlled between about 20° C. and about 280° C. in order to control the evaporation process. The evaporation process requires successive heating and cooling phases with respective different set-point temperatures.

The titration process can be carried out faster more accurately when the temperature is controlled accurately. Fast heating can be obtained with powerful heating elements. The accuracy of the temperature control depends also on the quality of the heating elements of the oven. Nevertheless, high temperatures imply a risk of overheating and/or combustion.

Ovens used with Karl Fischer titration systems are commercially available by e.g. Mettler-Toledo. A known drawback of these ovens is that not only the sample within the oven is heated, but also the housing or outer shell of the oven. Therefore, these ovens resp. Karl Fischer titration systems have to be handled carefully by the operator due to the hot outer surface of the oven and/or in order to avoid overheating of the samples prior to introduction into the oven.

The temperature in an oven used with a Karl Fischer titration system has to be controlled accurately by increasing, maintaining or decreasing said temperature.

A way to reduce heat losses from the oven to the environment is by surrounding the oven with a thermal insulation jacket, which reduces heat losses and thus allows a better temperature control during the heating phases. The temperature of the oven can be controlled easily and accurately as long as the temperature of the oven has to be increased or maintained.

When the temperature of the oven has to be reduced, as the heat absorbed by the material of the oven dissipates slowly into the environment, thermal inertia becomes an issue.

For cooling phases, it is known that ovens can be passively cooled, i.e. by reducing or switching off the heating. This process is time consuming and relies solely on the temperature difference between the oven and the environment for cooling, which is a passive cooling process. Although a thermal insulation jacket allows a better temperature control during heating phases, for passive cooling said insulation jacket has the disadvantage of slowing down the passive cooling.

There is a need to provide a faster automated Karl Fischer titration system. Therefore, an object of the present invention is to provide an analytical device with an oven arrangement which temperature is controlled quickly and accurately during temperature increases as well as temperature decreases, while reducing the risks of operational mishandling due to a hot outer surface.

SUMMARY

According to the present invention an analytical device is provided, comprising an oven arrangement with an oven, an insulation system, a ventilation system and a housing, wherein the ventilation system comprises a first and a second convection system. The first convection system is based on natural convection and is used to cool the housing. The second convection system is based on forced convection and is used to reduce the temperature within the oven. Such an analytical device is preferably suitable for Karl Fischer titration or any chemical, biological or physical analysis requiring an oven for sample heating.

The insulation system is designed to thermally insulate the oven in order to reduce or prevent an unwanted temperature exchange between the oven and the environment. Thus, it reduces heat losses from the oven, and in addition reduces and preferably minimises the heating of the housing comprising the oven.

The term "convection" is used in the context of the current invention as the convection or motion of a gas and in particular as air movement or air flow. In a natural convection system, the air movement is not generated by an external source. In such a natural convection system the heat generated in the system is transferred to the cooler surrounding gas or air, which in course is heated up and flows upwards, thereby creating one or more upwards flowing air flows, which results in a cooling effect. The movement of the warm air implies a movement of cooler air replacing the warmer air leaving an area. In a forced convection system, the air movement and thus the heat transfer results from external forces, from a ventilation device such as a fan or a pump.

In the present invention the ventilation system comprises two convection systems. A first convection system is arranged to cool the housing of the oven arrangement and a second convection system is configured to lower the temperature of the oven. The first convection system is a natural convection system and the second convection system is a forced convection system. In said forced convection system the air movement occurs through an external ventilation device, for example a fan or a pump.

A natural convection system does not depend from any power source and thus heat transfer occurs also when the heating is switched off. This has the advantage that the housing is continually cooled, even after the heating is switched off or in case the forced convection system fails to work properly or is switched off. The natural convection system continues to cool the housing as long as the temperature of the air flowing into the said system is low enough to take up surplus heat from the oven arrangement.

Due to a lateral insulation jacket the temperature of the oven can be increased rapidly and accurately. The forced convection system contributes to a rapid and accurate temperature reduction in the oven and is facilitated by the ventilation device, which causes or forces the air movement. The forced convection system overcomes the thermal inertia caused by the mass of material constituting the oven and by the lateral insulation jacket. Thus, the combination of natural and forced convection enhances the speed of the titration process.

Preferably the housing of the oven arrangement of the the analytical device comprises a bottom, a wall element and a cover, wherein the insulation system further comprises a base insulation arranged in the housing to carry the oven. The base insulation comprises a support system, a lateral insulation jacket surrounding the oven and being in contact with the base insulation, and an inner capping. The inner capping is arranged on the oven and prevents the cover from the heat of the oven. Made from a particularly heat resistant material, the inner capping facilitates the thermal decoupling between the oven and the housing.

The housing is arranged so that the wall elements sits on the bottom. The wall element surrounds the oven arrangement. The cover is arranged on top of the wall element and comprises an aperture allowing the introduction of a vial respective of a sample. The oven, the insulation system and the ventilation system are arranged within the housing. In addition, due to its design the wall element is part of the first convection system.

The oven rests approximatively in the middle of the base insulation. The base insulation may comprise protuberances arranged so to minimize the contact between the base insulation and the oven and thus facilitating the heat transfer from the oven into the housing.

The base insulation preferably comprises a good insulating material. This prevents the heat transfer or penetration from the oven through the base insulation and into the bottom of the housing, respectively the underlying supporting structure, such as a table. Thus, the bottom of the housing is thermally decupled from the oven and does not get heated by the oven.

In addition, due to the support system of the base insulation holding the oven apart from the bottom of the housing, the base insulation ensures that the oven has a defined position inside the housing. Advantageously the support system comprises raised pillars. Raised pillars allow a minimal contact between the base insulation and the bottom of the housing. Due to said support system a free space between the wall element, the bottom of the housing and the base insulation, forming a bottom air chamber, which is part of the forced convection system an allows the air to circulate within said free space.

A lateral insulation jacket rests on the insulation base. The said insulation jacket surrounds the oven, preferably separated from the oven in order to let a free space between the lateral insulation jacket and the oven forming an inner air chamber. The base insulation comprises apertures allowing air to flow from the bottom air chamber into the inner air chamber.

In another embodiment, the first convection system comprises an outer air chamber, arranged between the lateral insulation jacket and the housing. The housing comprises bottom apertures allowing the passage of air between the environment and the lower region of the outer air chamber, and top apertures allowing the air passage between the upper region of the outer air chamber and the environmental air.

The terms "top", "bottom", "lower" and "upper" are used here in relation to the vertical axis, wherein the top as the upper elements designates elements that are arranged upwards in relation to the vertical axis of the oven arrangement as shown in the figures. In the same way the bottom and the lower element designate elements downwards in relation to the vertical axis.

As long as the air within the outer air chamber has a higher temperature than the environmental air, a stream of environmental air flows through the lower apertures into the outer air chamber, thereby carrying the warmer air inside the outer chamber upwards and outwards through the upper apertures. This natural convection process results in the cooling of the housing of the oven arrangement, as the heat within the outer air chamber is carried out of said chamber with the passing stream of heated environmental air.

Preferably, the first convection system comprises an outer air chamber, which surrounds the lateral insulation jacket, advantageously without direct contact between the lateral insulation jacket and the wall element. These two features improve considerably the efficiency of the first convection system, as space is available for heat transfer into the air.

In another embodiment, the bottom apertures and/or the top apertures are each arranged, aligned on horizontal lines, in relation to the top and the bottom of the housing. They may be round, rectangular, or of any other suitable shape. They could form also a continuous aperture within the wall element. The lower respectively the upper apertures are arranged on a horizontal line in relation to the bottom of the housing.

The first convection system allows the safe handling of the oven arrangement while the oven within the oven arrangement is hot without requiring any external power, as it cools the housing of the oven arrangement by natural convection. Hence, it overcomes also the problem caused by the thermal inertia once the heating of the oven has stopped.

In a further embodiment of the analytical device, the second convection system comprises a ventilation device and a bottom air chamber, which bottom air chamber is defined by the base insulation, the bottom of the housing and the wall element; an inner air chamber and an intermediate air chamber. The ventilation device facilitates the introduction of an air stream into the bottom air chamber, which with the inner air chamber, the inner air chamber is connected with the intermediate air chamber and the intermediate air chamber is connected with the top apertures of the housing. In particular, the inner air chamber is arranged between the oven and the lateral insulation jacket and separates the same from each other. The outer air chamber is arranged between the lateral insulation jacket and the wall element; and the intermediate air chamber is arranged between the lateral insulation jacket and the inner capping. Further, the base insulation comprises apertures for connecting the bottom air chamber with the inner air chamber.

The ventilation device is arranged inside and/or outside of the oven arrangement. If it is outside, it is connected to the housing through an air connector. In any case, the ventilation device is configured to blow air into the bottom air chamber.

The space between the oven, the base insulation and the lateral insulation jacket forms the inner air chamber. The bottom air chamber is connected with the inner air chamber through apertures in the base insulation, which are arranged around the oven, between the oven and the lateral insulation jacket, allowing the passage of the air drawn by the ventilation device into the inner air chamber.

The air contained in the inner air chamber is in direct contact with the oven and thus absorbs the heat dissipated by the oven, thereby the air is carried upwards due to the forced convection enabled by the ventilation device and due to heat transferred from the oven to the surrounding air.

An intermediate air chamber is formed between the lateral insulation jacket and the cover of the housing, as the lateral insulation jacket is separated i.e. not in contact with the cover of the housing. The intermediate air chamber is connected with the inner air chamber, which is arranged between the cover and the lateral insulating jacket, thereby, allowing the air stream generated by the ventilation device to flow from the bottom air chamber via the inner air chamber, the intermediate air chamber and the outer air chamber towards the upper apertures, through which the air stream leaves the oven arrangement. This represents the forced convection system.

In another embodiment, the lateral insulation jacket is a prefabricated piping system with an outer conduit insulated with e.g. a polyurethane foam insulation and a jacket of e.g. filament wound fiberglass or extruded HDPE jacket known on the market under the trademark MULTITHERM 500 from Techno Physik Engineering GmbH of Essen, Germany, which presents highly insulating properties. The lateral insulation jacket may comprise mineral or ceramic insulating material that tolerates 300 degrees.

In a further embodiment the base insulation comprises hydrous phyllosilicate mineral with very good heat insulating properties, e.g. such as the one known under the generic designation VERMICULITE.

Advantageously, the housing comprises a polymer, such as polybutylene terephthalate or polypropylene.

Preferably, the cover of the housing comprises a thermoplastic.

In another embodiment, the inner capping comprises polytetrafluoroethylene or a like polymer being thermally non-conductive.

BRIEF DESCRIPTION OF THE DRAWINGS

The invention is described in more detail hereinafter with reference to exemplary embodiments. However, the invention is not limited to these exemplary embodiments.

DETAILED DESCRIPTION

The illustrations shown in the figures are schematics and similar or identical elements are provided with the same reference signs.

Figure 1:
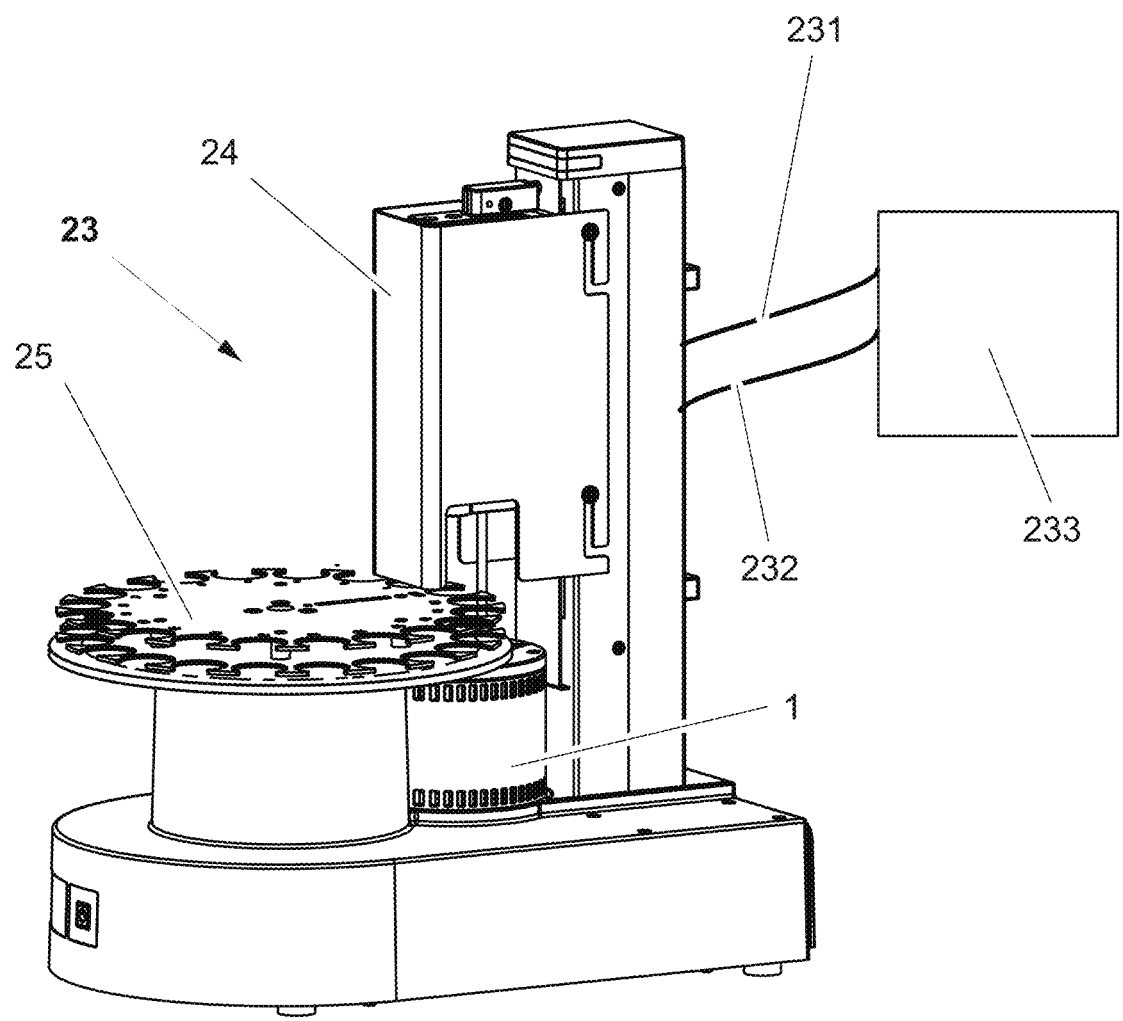
FIG. 1 is a three dimensional view of a sampling system for an analytical device with an oven arrangement according to the invention.

FIG. 1 shows an analytical device 23 suitable to be used as part of a Karl Fischer titration system with an oven arrangement 1. It comprises a sample changer 25 that is here configured to hold and move up to thirty vials. The vials are not visible on this figure. By turning about its vertical central axis the sample changer 25 transfers each vial towards the oven arrangement 1. A lift system 24 transfers each vial individually downwards into the oven arrangement 1 which allows each sample to be heated within the oven arrangement 1. In a first step a first line brings a carrier gas in the oven and the oven is heated so that the sample can be evaporated and transferred via a second line 232 to a titration cell, in particular a Karl Fischer titration cell of a Karl Fischer titration system 233.

Figure 2:
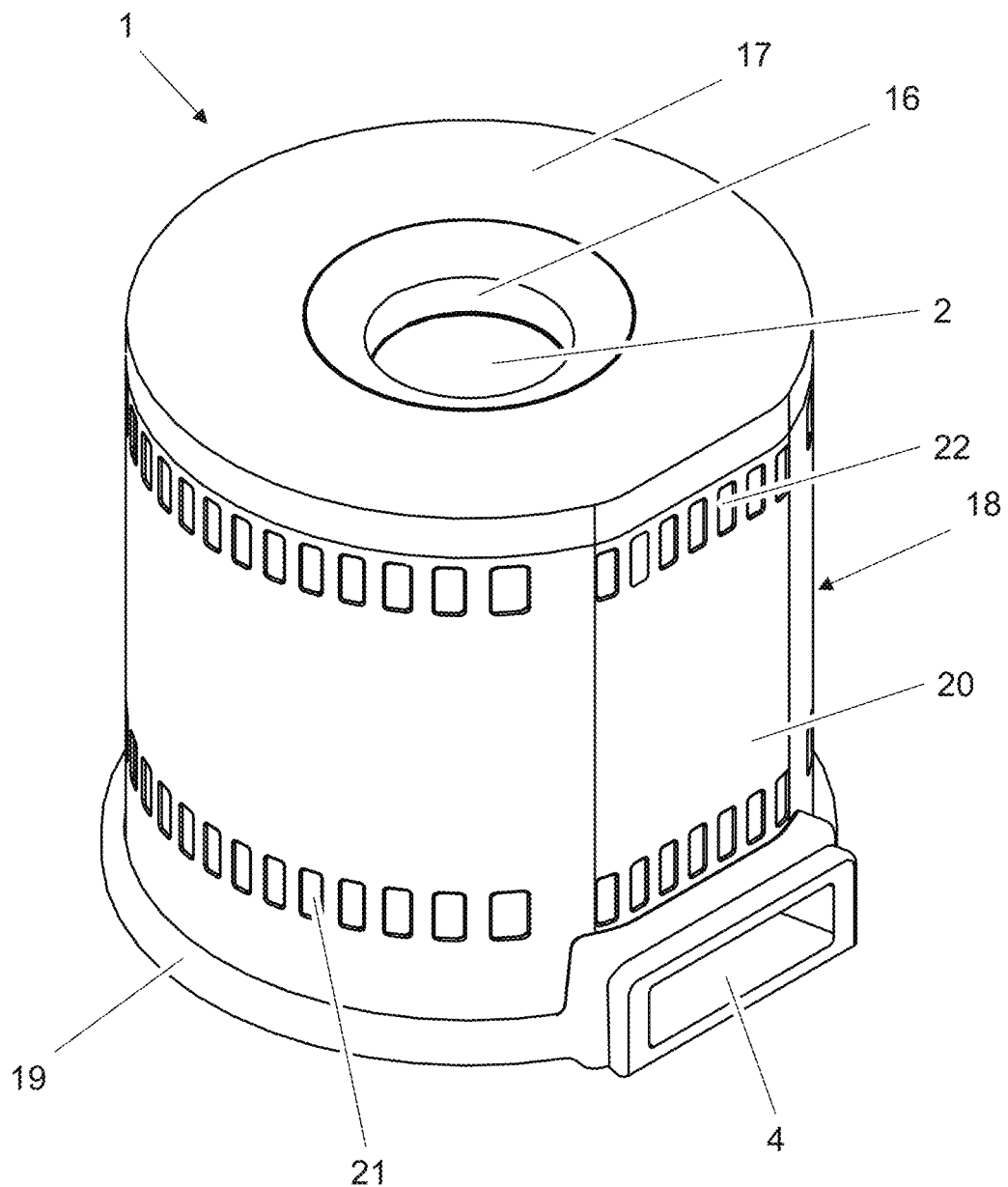
FIG. 2 is a three dimensional view of an oven arrangement according to the invention.

FIG. 2 illustrates an oven arrangement 1 comprising a ventilation system and an insulation system within a housing 18. The housing 18 comprises a wall element 20, a bottom 19 and a cover 17, wherein the bottom 19 is connected with an air connector 4. The air connector 4 is connected with the housing 18, so as to provide a hermetically closed connection.

Figure 4:
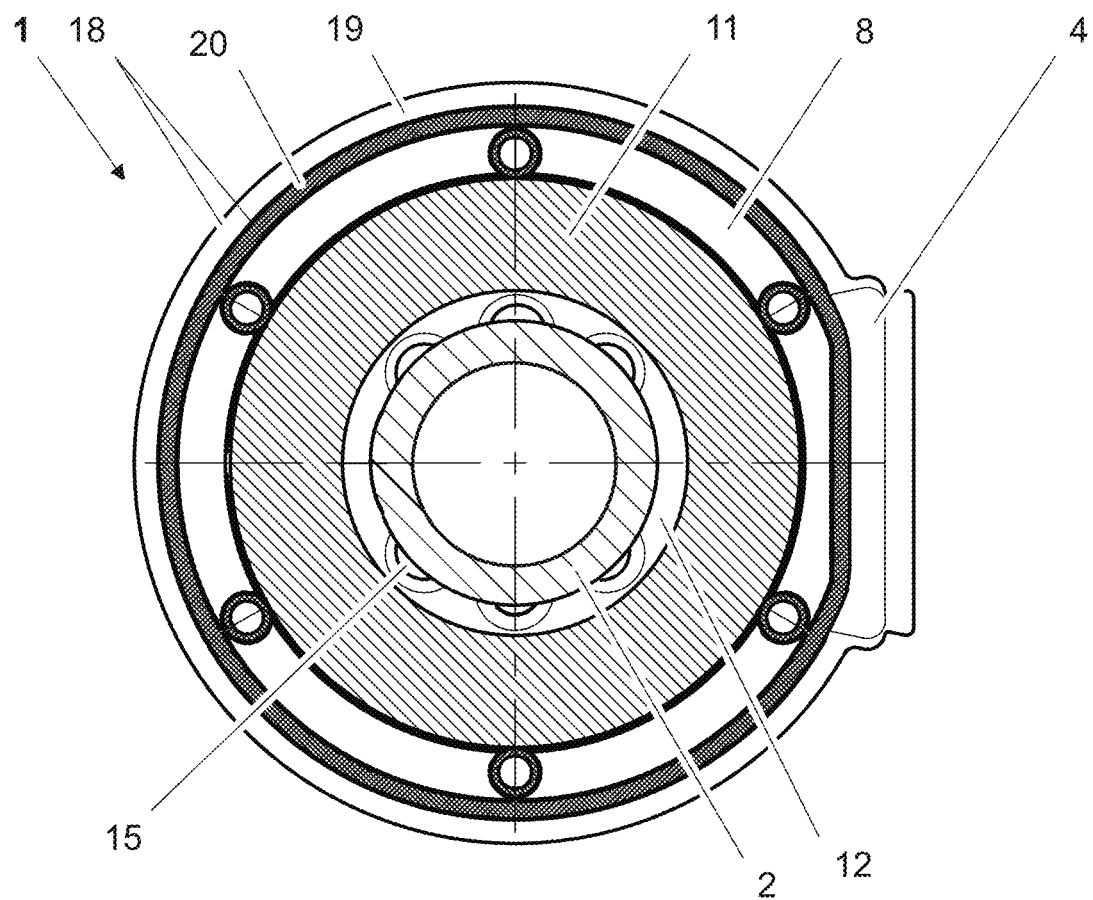
FIG. 4 is a horizontal cross sectional view of the oven arrangement according to the invention.
Figure 5:
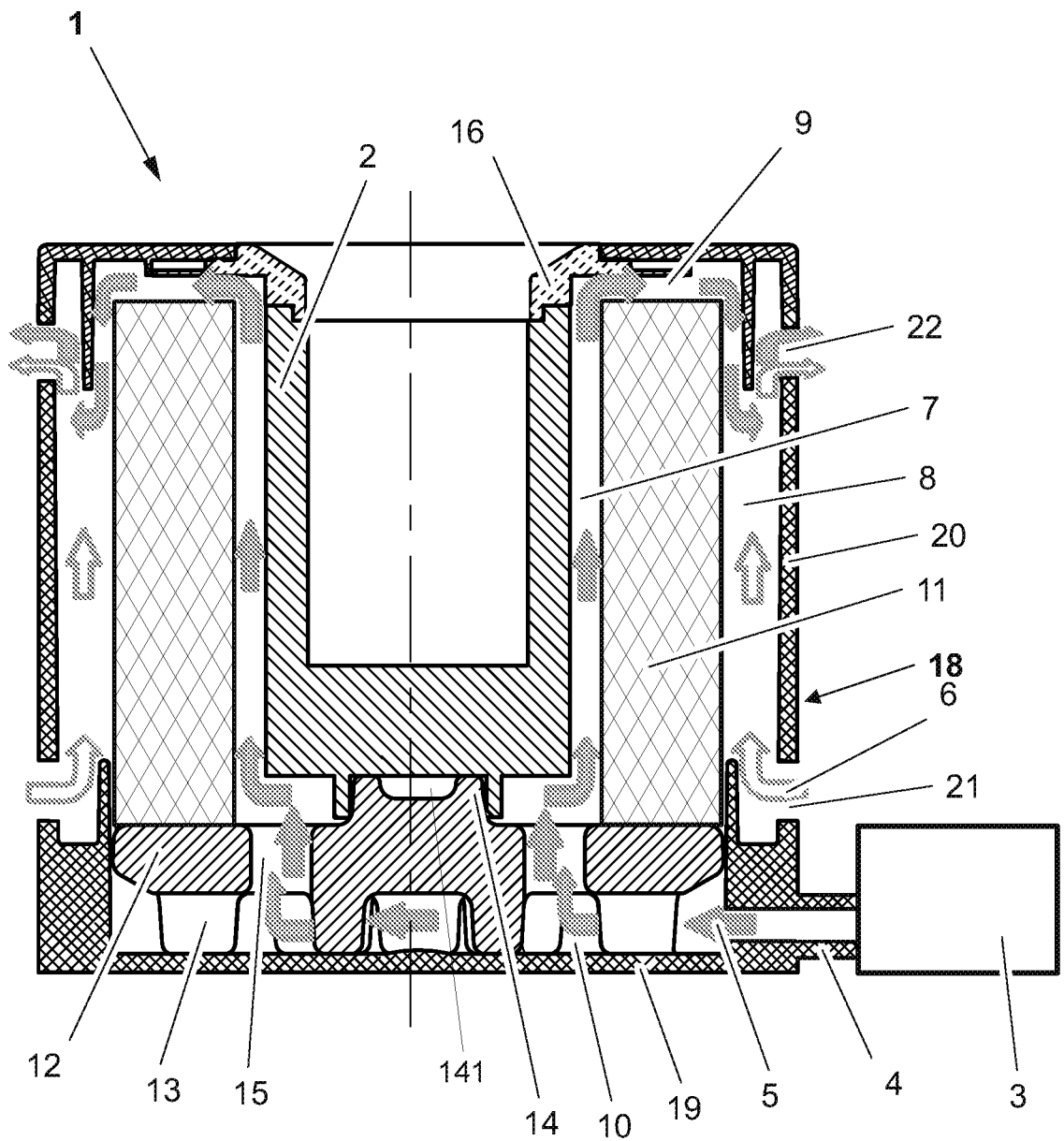
FIG. 5 is a vertical cross sectional view of an oven arrangement according to the invention.

The air connector 4 allows the connection of a ventilation device such as a fan or a pump and thus the drawing of an environmental air stream into respective from a bottom air chamber, located beneath a base insulation and an oven 2 (see also FIGS. 4 and 5).

An inner capping 16 is arranged beneath the cover 17 of the housing 18 and in contact with the cover 17. The inner capping 16 prevents any direct contact between the oven 2 and the housing 18. The cover 17 and the inner capping 16 each comprise an aperture for introducing a sample vial into the oven 2.

The wall element 20 comprises bottom and top apertures 21, 22. Bottom apertures 21 are aligned horizontally in relation to the bottom 19 of the housing 18, around the housing 8 in the lower part of the wall element 20, close to the bottom 19 of the housing 8. Top apertures 22 are aligned around the housing 18 in the upper part of the wall element 20, close to the cover 17.

The bottom apertures 21 and the top apertures 22 are connected with an outer air chamber 8 (see FIGS. 4 and 5). The bottom apertures 21 allow an air exchange between the environmental air and the outer air chamber 8, for the natural air stream. The top apertures 22 allow air exchange between an outer air chamber 8 and an intermediate air chamber 9 and the environmental air for the natural and respectively the forced air stream (see FIGS. 4 and 5).

Figure 3:
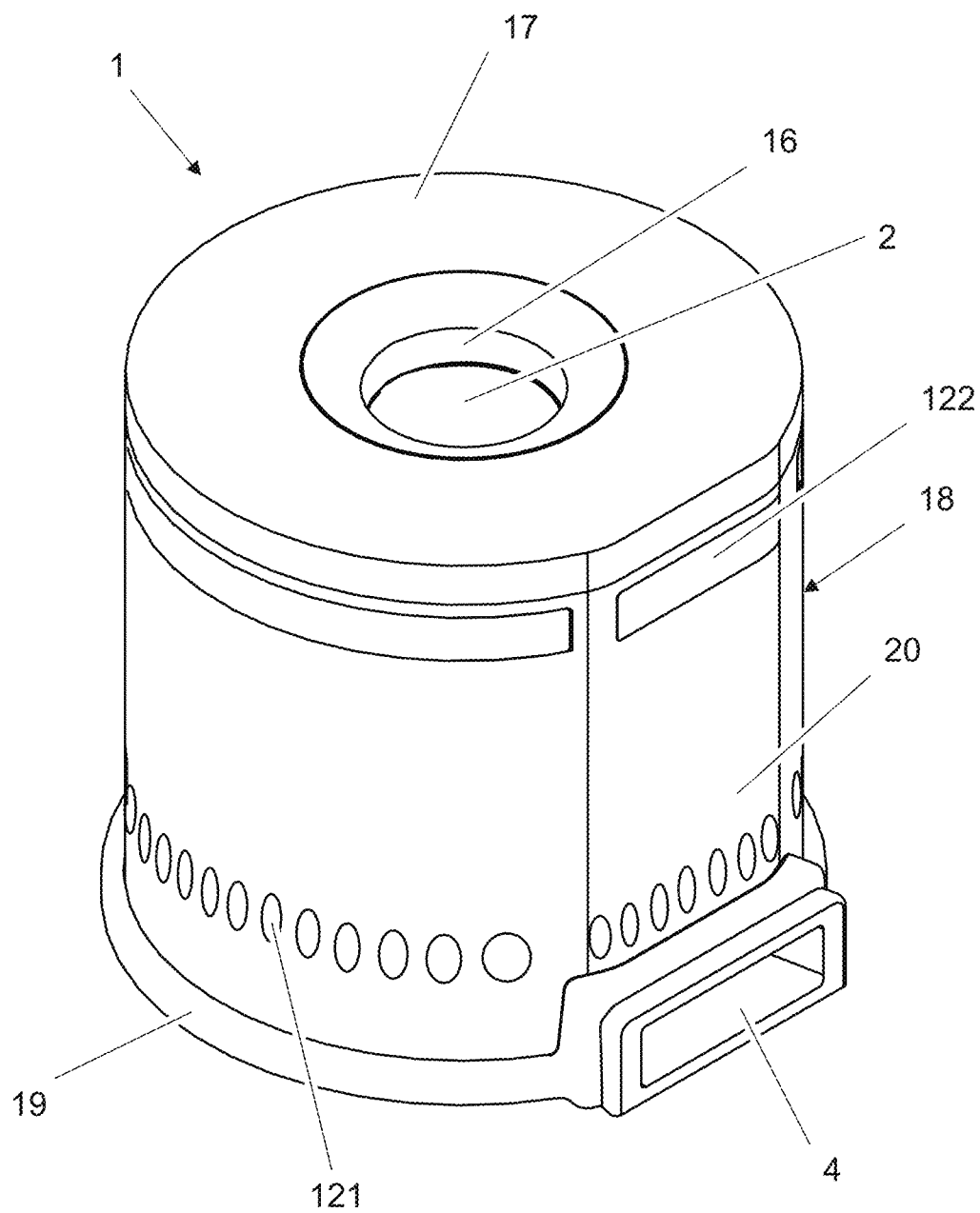
FIG. 3 illustrates a three dimensional view of another oven arrangement according to the invention.

FIG. 3 illustrates another oven arrangement 1 according to the invention. This oven arrangement 1 differs from the one shown in FIG. 2 in particular through the shape and form of the top and the bottom apertures 121, 122 of the housing 18. The top apertures 122 are oblong and arranged continuously on a horizontal line in respect to the bottom of the housing 18.

The bottom apertures 121 are aligned on a horizontal line in respect to the bottom 19 of the housing 18 and have a round or oval shape.

It is understood, that the top and/or bottom apertures of an oven arrangement in accordance with the invention can have any shape or form, in particular any combination of the shapes and forms shown in FIGS. 2 and 3.

FIG. 4 shows a horizontal cross-sectional view of an oven arrangement 1. The oven 2 comprises a space for holding a sample or sample vial. The space between the lateral insulation jacket 11 and the oven 2 represents a base insulation 12 on which rests the oven 2. The base insulation 12 comprises apertures 15 allowing air passage from the bottom up.

An outer air chamber 8 surrounds the lateral insulation jacket 11 and is in direct contact with the same. A wall element 20 closes off the outer air chamber 8, thereby leaving an inlet and an outlet opening for the air to enter and exit the outer air chamber. The wall element 20 rests on the bottom 19 of the housing 18, to which it is connected by material bridges as shown in FIGS. 2 and 3. The bottom 19 and the wall element 20 of the housing 18 can also be made as a single piece.

An air connector 4 is configured to let air pass beneath the base insulation 12.

FIG. 5 shows a vertical cross-sectional view of an oven arrangement 1 with a ventilation system and an insulation system, both of which are arranged within a housing 18. The housing 18 comprises a bottom 19, a wall element 20 and a cover 17. The insulation system comprises a lateral insulation jacket 11 resting on a base insulation 12. An oven 2 is arranged approximately over the middle of the base insulation 12. The base insulation comprises protuberances 14 creating a space 141 between the oven 2 and the base insulation 12.

The ventilation system comprises a forced convection system, which comprises a ventilation device 3, a bottom air chamber 10, an inner air chamber 7, an intermediate air chamber 9 and an outer air chamber 8. The forced air stream 5 is illustrated with filled in arrows and streams moved by the ventilation device 3 from the bottom air chamber 10 through the inner air chamber 7 and the intermediate air chamber 9 into the outer air chamber 8, which comprises top apertures 22 through which the heated up air can exit outer air chamber 8.

The base insulation 12 is arranged in the bottom 19 of the housing 18. The base insulation 12 is in continuous contact with the wall element 20. The base insulation 12 comprises a support system 13 letting a free room between the base insulation 12 and the bottom 19 of the housing 18. The free room is defined by the bottom 19, the wall element 20 and the insulation base forms the bottom air chamber 10. Due to minimal contact between the support system 13 and the bottom 19 of the housing 18, the support system 13 prevents heating up of the bottom of the housing 19.

The oven 2 rests on the base insulation 12 and is surrounded by the lateral insulation jacket 11. The oven 2 is cylindrical and rests on protuberances 14 rising up from the top of the base insulation 12, so that the bottom surface of the oven 2 is only partially in contact with the base insulation 12 and a space 141 is created beneath the bottom of the oven 2. This allows the forced and/or natural air stream to circulate through said space, thereby taking away the heat dissipating from the oven into said space. The oven 2 is surrounded with the lateral insulation jacket 11, in such a way that the lateral insulation jacket 11 and the oven 2 are separated by the inner air chamber 7.

The ventilation device 3 is arranged outside the housing and is connected to the housing through an air connector 4. The air connector 4 is arranged below the base insulation 12, so that the ventilation device 3 draws and directs environmental air from underneath the base insulation 12 into the bottom air chamber 10, which is delimited by the bottom 19, the wall element 20 and the base insulation 12. The base insulation 12 comprises apertures 15 allowing the air stream to flow from the bottom air chamber 10 into the inner air chamber 7.

The natural air stream 6 is illustrated with the contoured arrows, for which environmental air flows through the lower apertures 21 into the outer air chamber 8, which it exits through the top apertures 22. The air movement of the natural air stream 6 is facilitated by heat dissipating from the oven 2 into the outer air chamber 8, which is there taken up by the passing natural air stream 6, which thereby removes the heat from the oven arrangement.

What is claimed is:

1. An analytical device having an oven arrangement that comprises:
    an oven,
    a housing comprising a bottom, a wall element and a cover;
    where the wall element of the housing comprises bottom apertures that allow air to pass between the external environment and the lower region of the outer air chamber, and top apertures that allows air to pass between the upper region of the outer air chamber and the external environment;
    an insulation system, comprising:
        a base insulation, arranged in the housing, comprising a support system that supports the oven and having apertures;
        a lateral insulation jacket, that surrounds the oven and is in contact with the base insulation; and
        an inner capping, arranged on the oven to thermally decouple the oven and the cover of the housing, and
    a ventilation system comprising:
        a first convection system that is a natural convection system, configured to cool the housing; and
        a second convection system that is a forced convection system, configured to reduce the temperature within the oven, the second convection system comprising a bottom air chamber that is defined by the base insulation, the bottom of the housing and the wall element, an inner air chamber, arranged between the oven and the lateral insulation jacket, the inner air chamber connected with the bottom air chamber through the apertures of the base insulation, an intermediate air chamber, arranged between the lateral insulation jacket and the inner capping, the intermediate aft chamber connected with the inner air chamber and with the top apertures of the housing, and a ventilation device, arranged to draw aft into the bottom air chamber, such that an aft stream, driven by the ventilation device, moves from the bottom air chamber through the inner air chamber and the intermediate aft chamber towards the top apertures of the housing.

2. The analytical device of claim 1, wherein:
    the first convection system comprises an outer air chamber, arranged between the lateral insulation jacket and the wall element of the housing.

3. The analytical device of claim 2, wherein the outer air chamber surrounds the lateral insulation jacket, without contact between the lateral insulation jacket and the wall element.

4. The analytical device of claim 2, wherein the bottom apertures, the top apertures, or both, are each arranged aligned on horizontal lines in relation to the top and the bottom of the housing.

5. The analytical device of claim 1, wherein the ventilation device is connected with the bottom air chamber through an air connector, the ventilation device being arranged either inside the housing, outside the housing, or both.

6. The analytical device of claim 1, wherein the oven is separated from the lateral insulation jacket.

7. The analytical device of claim 1, wherein the base insulation comprises protuberances, arranged to support the oven.

8. The analytical device of claim 1, wherein the lateral insulation jacket surrounding the oven is a prefabricated piping system with an outer conduit insulated with at least one of: polyurethane foam, a filament wound fiberglass, extruded high-density polyethylene ("HDPE") and combinations thereof.

9. The analytical device of claim 1, wherein the base insulation comprises hydrous phyllosilicate mineral.

10. The analytical device of claim 1, wherein the housing comprises polybutylene terephthalate or polypropylene.

11. The analytical device of claim 1, wherein the cover of the housing comprises thermoplastic.

12. The analytical device of claim 1, wherein the inner capping for thermal decoupling comprises polytetrafluoroethylene.

13. A Karl Fischer titration system comprising an analytical device according to claim 1.

14. The analytical device of claim 1 wherein the oven is used to evaporate a sample being analyzed.

* * * * *

UNITED STATES PATENT AND TRADEMARK OFFICE
CERTIFICATE OF CORRECTION

PATENT NO. : 10,809,238 B2  
APPLICATION NO. : 16/059520  
DATED : October 20, 2020  
INVENTOR(S) : Forrer Page 1 of 1

It is certified that error appears in the above-identified patent and that said Letters Patent is hereby corrected as shown below:

On the Title Page

Item (30), Foreign Application Priority Data, please delete "Aug. 10, 2017 (EP) ................17185696" and insert -- Aug. 10, 2017 (EP) ................17185696.6 --.

In the Claims

In Column 8, Line 23, Claim 1 please delete "allows" and insert -- allow --.

In Column 8, Line 48, Claim 1 please delete "aft" and insert -- air --.

In Column 8, Line 50, Claim 1 please delete "aft" and insert -- air --.

In Column 8, Line 51, Claim 1 please delete "aft" and insert -- air --.

In Column 8, Line 54, Claim 1 please delete "aft" and insert -- air --.

Signed and Sealed this  
Twenty-second Day of December, 2020

Andrei Iancu  
*Director of the United States Patent and Trademark Office*